March 15, 1927.
L. M. PARKHURST
1,620,915
GYPSUM PRODUCT AND METHOD OF PRODUCING THE SAME
Filed May 6, 1922
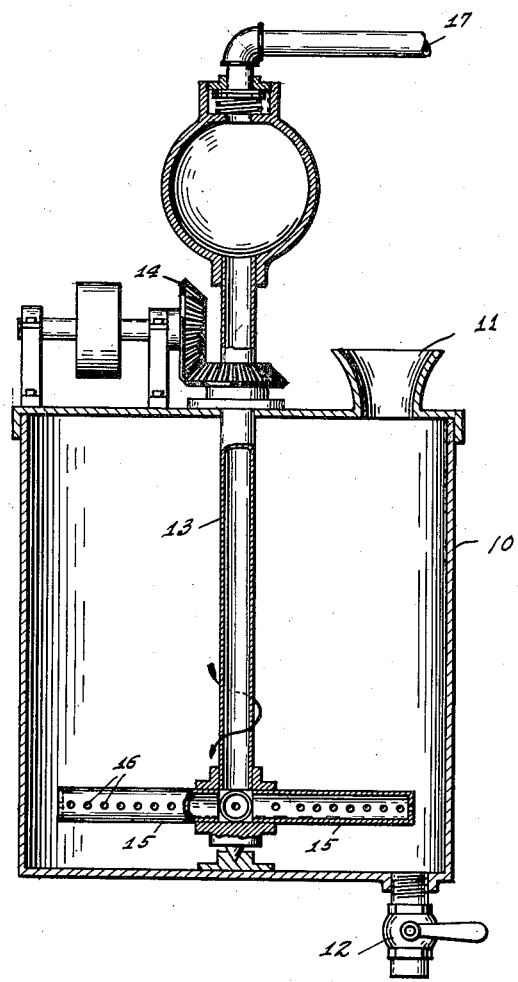
Inventor
Layton M. Parkhurst,
By Arthur M. Hood
Attorney Patented Mar. 15, 1927.

1,620,915

UNITED STATES PATENT OFFICE.

LAYTON M. PARKHURST, OF INDIANAPOLIS, INDIANA, ASSIGNOR, BY MESNE ASSIGNMENTS, TO FEDERAL GYPSUM PRODUCTS COMPANY, OF CHICAGO, ILLINOIS, A CORPORATION OF DELAWARE.

GYPSUM PRODUCT AND METHOD OF PRODUCING THE SAME.

Application filed May 6, 1922. Serial No. 559,113.

Blocks or cakes formed from a mixture of calcined gypsum and water, have been well-known for many years and the fragile character of such product has been a serious obstacle to the use thereof in building constructions although large quantities of building blocks, for partitions, etc., have been produced and used.

In the production of such a product, great care has to be exercised in providing a rather exact proportion of water because an excess of water resulted either in a product which was even more fragile or in a liquid which would not "set" or which would "rot" upon exposure to the air. It is well known that in producing such a product, the "set" occurs very quickly and difficulty has been experienced in obtaining efficiency from ordinary available labor.

I have discovered that, by mixing carbon dioxide with calcined gypsum and water, I can produce a product, the setting time of which is somewhat delayed; in which a greater proportion of water may be used; which will "set" in the presence of even a large excess of water; which will have adequate strength to permit handling and use immediately following removal from the molds; which does not require any period of seasoning; which is of greater bulk per unit of calcined gypsum than has heretofore been obtainable; which is of very much greater strength than prior gypsum products, and which is not so dependent upon accuracy of proportionment of water and calcined gypsum as has heretofore been found important.

My process may be carried out and the product produced by hand but a specially designed mixing mechanism is more convenient and the accompanying drawing is a vertical section of such an apparatus.

In the drawing, 10 indicates a suitable container having an inlet 11 and a valve outlet 12. Mounted in the container 10 is a hollow, vertical shaft 13 capable of being rotated by a suitable driving gearing 14 and provided near its lower end with a series of radiating, hollow arms 15 which are provided on their rear sides with perforations 16. A gas supply line 17 is connected with the upper end of shaft 13 so as to permit freedom of rotation of the shaft 13.

In carrying out my process, I have obtained very satisfactory results by taking one volume of calcined gypsum, of the character commonly found on the market, and two volumes of water. These are placed in the container 10, shaft 13 is rotated, and carbon dioxide injected into the mixture during the period of rotation of the shaft 13. I think it advisable to rotate the shaft at a fairly good speed and the mixing is carried on for about three minutes. I am not able to say, at the present time, just how much carbon dioxide is used. Up to the present time, the gas has been delivered under comparatively small pressure from commercial cylinders which are readily obtainable in the market and the supply of gas is maintained during the mixing period of about three minutes. Thereupon, the mixture, which is in the form of a rather thick cream, is drained off into molds in which it sets very promptly, the resulting product having a volume considerably in excess of that which would be obtained if calcined gypsum were to be mixed in the ordinary manner with only a sufficient quantity of water to properly set in the usual manner.

If an excess of water has been used in the practice of my process, I find that it rises to the top of the mold seemingly without deleterious results on the product except that the surface of the set material, immediately below the excess of water, is somewhat friable.

I claim as my invention:

1. Process of making gypsum products which comprises preparing a mortar by mixing calcined gypsum with water and carbon dioxide.

2. Process of making gypsum products which comprises stirring calcined gypsum with water while supplying carbon dioxide thereto.

3. Process of making gypsum products which comprises mixing calcined gypsum with water and injecting carbon dioxide gas into the mixture during the mixing operation.

4. Process of making gypsum products which comprises mixing calcined gypsum with water in quantity sufficient to produce a thick cream and injecting carbon dioxide into the mixture during the mixing operation.

5. Process of making gypsum products which comprises mechanically agitating one volume of calcined gypsum with not less than one volume of water while injecting carbon dioxide into the mixture for a period of not less than about three minutes.

6. Process of making gypsum products which comprises mixing calcined gypsum with water in the presence of carbon dioxide and moulding the resulting mixture.

7. As a new product a mixture comprising the reaction products of calcined gypsum, water and carbon dioxide substantially free of alkali metal compounds.

8. As a new product a moulded mixture comprising the reaction products of calcined gypsum, water and carbon dioxide substantially free of alkali metal compounds.

9. As a new product a mixture comprising the reaction products of one part of calcined gypsum with not less than one part of water and carbon dioxide substantially free of alkali metal compounds.

10. As a new product a moulded mixture comprising the reaction products of one part of calcined gypsum with not less than one part of water and carbon dioxide substantially free of alkali metal compounds.

11. A product such as may be prepared by the hereindescribed process which comprises injecting carbon dioxide gas into a mixture of water and calcined gypsum while mechanically mixing the same and moulding the resulting mixture.

12. The product resulting from the mixture of calcined gypsum, water and carbon dioxide in the absence of alkali metal compounds.

13. The product resulting from the admixture of calcined gypsum with not less than an equal volume of water while injecting carbon dioxide into the mixture.

In witness whereof, I, LAYTON M. PARKHURST, have hereunto set my hand at Indianapolis, Indiana.

LAYTON M. PARKHURST.